US007395013B2

(12) United States Patent
Fukata

(10) Patent No.: US 7,395,013 B2
(45) Date of Patent: Jul. 1, 2008

(54) IMAGE FORMING DEVICE, IMAGE FORMING METHOD, AND PROGRAM

(75) Inventor: Takuya Fukata, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 255 days.

(21) Appl. No.: 11/288,356

(22) Filed: Nov. 29, 2005

(65) Prior Publication Data

US 2006/0115298 A1 Jun. 1, 2006

(30) Foreign Application Priority Data

Nov. 30, 2004 (JP) ............................. 2004-347487

(51) Int. Cl.
*G03G 15/36* (2006.01)
*G06K 9/36* (2006.01)

(52) U.S. Cl. ........................................ 399/194; 382/284

(58) Field of Classification Search ......... 399/182–185, 399/193, 196, 197; 358/1.18, 450; 382/284, 382/294–298
See application file for complete search history.

(56) References Cited

U.S. PATENT DOCUMENTS 5,051,843 A * 9/1991 Hayashi ...................... 358/450
5,140,348 A * 8/1992 Jamzadeh et al. ........... 347/115
5,222,157 A * 6/1993 Yoneda et al. .............. 382/306
5,671,463 A * 9/1997 Morikawa et al. ............. 399/86
2005/0140991 A1* 6/2005 Ogiwara et al. .............. 358/1.2

FOREIGN PATENT DOCUMENTS

JP 2000101839 A * 4/2000
JP 2000172116 A * 6/2000
JP 2002-86832 3/2002
JP 2002-335388 11/2002

* cited by examiner

*Primary Examiner*—Ryan Gleitz
(74) *Attorney, Agent, or Firm*—Westerman, Hattori, Daniels & Adrian, LLP.

(57) ABSTRACT

An image forming device, an image forming method, and a program intended to print out multiple documents of different sizes collectively in one output sheet with a margin upon adjustment of the magnification of the documents to an appropriate size. The image forming device used for combined printing is capable of printing image data obtained from multiple documents into one output sheet which includes a margin generating section for generating a margin area upon the output sheet, a document arranging section that arranges the multiple documents in a document depicting area without the margin area in the output sheet with respect to one corner of the document depicting area as a reference for the purpose of minimizing the generation of blanks, and a magnification processing section that adjusts the magnification of the multiple documents in order to make them fit into the document depicting area.

24 Claims, 9 Drawing Sheets

IMAGE FORMING DEVICE, IMAGE FORMING METHOD, AND PROGRAM

BACKGROUND OF THE INVENTION

1. Field of the Invention

The present invention relates to an image forming device, an image forming method, and a program intended to print out image data obtained from multiple documents in one output sheet of paper, and more particularly relates to an image forming device, an image forming method, and a program designed to print out multiple documents of different sizes in one output sheet of paper.

2. Description of Prior Art

A conventional technique relating to an image forming device which forms an image derived from multiple documents in one sheet of paper has been disclosed in Japanese Laid-Open Patent Publication No. 2002-335388 (Means to Solve the Problems—paragraphs numbered [0036] to [0044], and [0047] to [0050]), for example (hereinafter referred to as "Patent Document 1"). Such image forming device includes paper size detecting means to detect paper size, document size detecting means to detect the size of multiple documents, a counter for counting the number of documents, and margin setting means for setting margin intervals between multiple images of the documents when the images are formed on the same sheet of paper without overlapping. The image forming device then determines the reduction magnification of the total size of the documents which is calculated based on the number and size of the documents, the margin intervals between the images, and the sheet sizes, and forms the multiple document images in one sheet by reducing the document images without overlapping. The margin intervals are set in advance. Moreover, to improve the appearance of the composed image, the margin intervals of the various images are automatically set based on the selected paper size.

In this case, a predetermined table has been prepared in advance, and the margin intervals of the images are set in relation to the sizes of paper. Moreover, the appearance of the conveyed documents changes due to their size, and the margin intervals of the images are thus automatically set based on the size of the documents. On the other hand, a composed copy is produced by changing the magnification depending on the contents of a document so as to achieve unified magnification in one document containing characters, and to reduce the graphics contained in two documents loaded upon a document conveying device, for example. In this way, Patent Document 1 discloses a technique of forming images coming from multiple documents of the same size upon the same sheet of paper while margin intervals are provided, and overlapping is prevented by reduction.

Moreover, an image forming device which forms an image while setting margins for a read document has been disclosed Japanese Laid-Open Patent Publication No. 2002-86832 (paragraphs numbered [0006], [0008], [0043] to [0052]), for example (hereinafter referred to as "Patent Document 2"). The technique disclosed in Patent Document2 is such that when the device forms an image while setting margins for a read document, an image processing section forms the image by processing the image including the document and the margins, while changing the magnification thereof to ensure that it would fit into a transfer sheet of paper of a specified size. In this manner, the image forming device according Patent Document 2 eliminates the problem of setting margins to a sheet of paper of standard size, by ensuring that the size of the paper sheet does not deviate from the standard when margins are set.

However, while the technique disclosed in Patent Document 1 permits the forming of an image by reducing multiple documents to be uniform in size to fit the documents into one sheet while setting margin intervals, it does not consider allow the forming of an image derived from and by reducing documents of different sizes so as to fit the documents into one and the same sheet. Moreover, the prior art disclosed in Patent Document 1 does not consider the case for setting a margin in advance for staples, memos, or images or the like to be applied or inserted after printing. On the other hand, the technique disclosed in Patent Document 2 forms an image by adding margins to one document thereby altering the magnification of the multiple documents to fit them into one sheet, and does not consider either a case of forming images derived from multiple documents in one and the same sheet. Accordingly, these techniques do not permit the printing of multiple documents of different sizes in one output sheet of paper after allocating a margin.

SUMMARY OF THE INVENTION

The present invention aims to provide an image forming device, an image forming method, and a program which address the abovementioned problems of prior art by proving for the combined printing out of various documents of different sizes into one sheet of paper.

To attain this objective, the first aspect of the present invention provides for an image forming device used to generate the combined printing of image data obtained from multiple documents upon one, output sheet, including:

document arranging means that arranges the multiple documents to appear in the document depicting area of the output sheet with respect to one corner of the document depicting area-as a reference in order to minimize the generation of blank spaces; and magnification processing means that adjusts the magnification of the sizes of the multiple documents in order to fit all of them completely into the document depicting area.

The second aspect of the present invention provides for a forming device in accordance with the first aspect, including margin generating means that generates a margin area on the output sheet, wherein the margin generating means.; generates setting data for reserving a margin in advance for positioning and applying or inserting staples, memos, or images or the like, after printing.

The third aspect of the present invention provides for an image forming device in, accordance with the first aspect, where the document arranging means adjusts the magnification of the multiple documents to achieve uniform magnification to fit the overall area occupied by the multiple documents into the document depicting area of the output sheet, and sequentially arranges the multiple documents starting from the largest document with respect to one corner of the document depicting area as the reference point in order to minimize the generation of blank spaces.

The fourth aspect of the present invention provides for an image forming device in accordance with the first aspect, where the magnification processing means is configured to select the initial magnification process for adjusting the magnification of the image data of the multiple documents to achieve uniform magnification to fit them into the document depicting area without generating a protrusion, and thereafter, select a second magnification process that independently adjusts the magnification of the respective documents to eliminate any blank spaces in the document depicting area.

The fifth aspect of the present invention provides for an image forming device used to generate the combined printing of image data obtained from multiple documents in one output sheet, comprising:

document margin removing means that recognizes document margin areas of the plurality of documents, and removes the document margin areas to reduce the size of the documents;

document arranging means that arranges the plurality of documents to appear in the document depicting area of the output sheet with respect to one corner of the document depicting area as reference in order to minimize the generation of blank spaces; and magnification processing means that adjusts the magnification of sizes of the various documents in order to fit them completely into the document depicting area.

The sixth aspect of the present invention provides for the image forming device according to the fifth aspect, wherein the document margin removing means removes the margin areas of each of the documents in order to adjust its size from among default sheet sizes to the minimum sheet size into which the entire drawn area of the multiple documents will fit.

The seventh aspect of the present invention provides for the image forming device according to the fifth or sixth aspect, including border creating means that allocates borders at boundaries between the multiple documents arranged by the document arranging means on the output sheet.

The eighth aspect of the present invention provides for the image forming device according to the fifth aspect, including margin generating means that generates a margin area on the output sheet, where the margin generating means generates setting data for reserving a margin in advance for positioning and applying or inserting staples, memos or images or the like, after printing.

The ninth aspect of the present invention provides for the image forming device according to the fifth aspect, where the document arranging means adjusts the magnification of the multiple documents to achieve uniform magnification to fit the overall area occupied by the multiple documents into the document depicting area of the output sheet, and sequentially arranges the multiple documents starting from the largest document with respect to one corner of the document depicting area as the reference point in order to minimize the generation of blank spaces.

The tenth aspect of the present invention provides for the image forming device according to the fifth aspect, where the magnification processing means is configured to select the initial magnification process for adjusting the magnification of the image data of the multiple documents -to achieve uniform magnification to fit them into the document depicting area without running off the edges thereof, and thereafter select a second magnification process that independently adjusts the magnification of the respective documents to eliminate any blank spaces in the document depicting area.

The eleventh aspect of the present invention provides for an image forming method used to generate the combined printing of image data obtained from multiple documents in one output sheet, consisting of the following steps:

first, arranging the multiple documents to appear in the document depicting area of the output sheet with respect to one corner of the document depicting area as reference in order to minimize the generation of blank spaces; and second, processing the size of the multiple documents by changing the magnification to make the multiple documents fit entirely into the document depicting area.

The twelfth aspect of the present invention provides for the image forming method according to the eleventh aspect, comprising the step of generating a margin area on the output sheet, wherein the margin area generating step includes the generation of setting data for reserving a margin in advance for positioning and applying or inserting a staple, a memo, or an image, or the like, after printing.

The thirteenth aspect of the present invention provides for the image forming method according to the eleventh aspect, wherein the step of arranging the multiple documents involves the adjustment of the size of each of the various documents to achieve uniform magnification to fit the overall area occupied by the documents into the document depicting area on the output sheet and then sequentially arranges the documents starting from the largest document with respect to one corner of the document depicting area of the output sheet as reference point in order to minimize the generation of blank spaces.

The fourteenth aspect of the present invention provides for the image forming method according to the eleventh aspect, wherein the said step of processing the multiple documents by adjusting their magnification comprises the following steps: first, adjusting the magnification of the image data of the various documents to achieve uniform magnification in order to fit them into the document depicting area without running off the edges thereof, and second, independently adjusting the magnification of each of the documents to eliminate any blank spaces in the document depicting area and is configured to select the said first and second steps of magnification processing.

The fifteenth aspect of the present invention provides for an image forming method used to generate the combined printing of image data obtained from a multiple of documents in one output sheet, comprising the following steps:

first, recognizing document margin areas of the various documents, and removing their respective margin areas to reduce their size;

second, arranging the various documents in the document depicting area of the output sheet with respect to one corner thereof as reference to minimize the generation of blank spaces; and third, processing the documents by adjusting their magnification to fit all of them completely into the document depicting area.

The sixteenth aspect of the present invention provides for the image forming method according to the fifteenth aspect, wherein the step of reducing the size of the documents involves the removal of their respective margin areas in order to adjust their size from among default sheet sizes to the minimum sheet size into which the entire drawn area of the documents will fit.

The seventeenth aspect of the present invention provides for the image forming method according to either of the fifteenth or sixteenth aspects, comprising the step of allocating borders at the boundaries between the multiple documents arranged on the output sheet by virtue of the step of arranging the documents.

The eighteenth aspect of the present invention provides for the image forming method according to the fifteenth aspect, comprising the step of generating a margin area on the output sheet, wherein the said margin area generating step generates setting data for reserving a margin in advance for positioning and applying or inserting a staple, a memo, or an image or the like, after printing.

The nineteenth aspect of the present invention provides for the image forming method according to the fifteenth aspect, wherein the step of arranging the multiple documents involves adjusting their size to achieve uniform magnification to fit the overall area occupied by the multiple documents into the document depicting area on the output sheet, and thereafter sequentially arranging the documents starting from the largest document with respect to one corner of the document depicting area as the reference point in order to minimize the generation of blank spaces.

The twentieth aspect of the present invention provides for the image forming method according to the fifteenth aspect, wherein processing the multiple documents involves adjusting their magnification, consisting of two steps: first, adjusting the magnification of the image data of the documents to achieve uniform magnification in order to fit all of the documents into the document depicting area without running off the edges thereof, and second, independently adjusting the magnification of each of the documents to eliminate any blank spaces in the image, and is configured to select the said first and second steps of magnification processing.

The twenty-first aspect of the present invention provides for a program for causing a computer equipped with an image forming device used to generate the combined printing of image data obtained from multiple documents in one output sheet, comprising:

a process for arranging the multiple documents in the document depicting area of the output sheet with respect to one corner of the document depicting area as reference in order to minimize the generation of blank spaces; and a process for adjusting the magnification of sizes of the plurality of documents in order to fit all of the documents into the document depicting area.

The twenty-second aspect of the present invention provides for a program according to the twenty-first aspect, comprising a process for generating setting data for reserving a margin in advance for positioning and applying or inserting a staple, a memo, or an image, or the like, after printing; and a process for generating a margin area on the output sheet based on the setting data.

The twenty-third aspect of the present invention provides for a program wherein the process for arranging the multiple documents involves adjusting their size to achieve uniform magnification in order to fit the overall area occupied by the documents into the document depicting area on the output sheet, and thereafter sequentially arranging the documents starting from the largest document with respect to one corner of the document depicting area as the reference point in order to minimize the generation of blank spaces.

The twenty-fourth aspect of the present invention provides for the program according to the twenty-first aspect, wherein adjusting the magnification of multiple documents comprises two processes: first, changing the magnification of the image data of each of the documents to achieve uniform magnification in order to fit them into the document depicting area without running off the edges thereof, and second, independently adjusting the magnification of the respective documents to eliminate any blank spaces in the document depicting area, and is configured to select the said first and second processes of magnification.

The twenty-fifth aspect of the present invention provides for a program for causing a computer equipped with an image forming device used to generate the combined printing of image data obtained from multiple documents in one output sheet, comprising:

a process for recognizing the document margin areas of each of the documents, and removing their respective margin areas to reduce their size;

a process for arranging the various documents in the document depicting area of the output sheet with respect to one corner thereof as reference to minimize the generation of blank spaces;

a process for adjusting the magnification of sizes of the plurality of documents in order to fit all of the documents into the document depicting area.

The twenty-sixth aspect of the present invention provides for a program according to the twenty-fifth aspect, wherein the process for reducing the size of each of the documents involves removing the margin area so as to adjust the size of each document from among default sheet sizes to the minimum sheet size into which the entire drawn area of the documents will fit.

The twenty-seventh aspect of the present invention provides for a program according to either of the twenty-fifth or twenty-sixth aspects, comprising a process of allocating a border at the boundary between the multiple documents arranged on the output sheet by virtue of the said process of arranging the documents.

The twenty-eighth aspect of the present invention provides for a program according to the twenty-fifth aspect, comprising:

a process for generating setting data for reserving a margin in advance for positioning and applying or inserting a staple, a memo, or an image or the like, after printing; and a process for generating a margin area on the output sheet based on the setting data.

The twenty-ninth aspect of the present invention provides for a program according to the twenty-fifth aspect, wherein the process for arranging the multiple documents involves adjusting the size of each of the documents to achieve uniform magnification in order to fit the overall area occupied by the documents into the document depicting area on the output sheet, and thereafter sequentially arranging the documents starting from the largest document with respect to one corner of the document depicting area as the reference point in order to minimize the generation of blank spaces.

The thirtieth aspect of the present invention provides for a program according to the twenty-fifth aspect wherein adjusting the magnification of the multiple documents comprises two processes: first, magnifying the image data of each of the documents to achieve uniform magnification in order to fit the multiple documents into the document depicting area without running off the edges thereof, and second, independently adjusting the magnification of the respective documents to eliminate any blank spaces in the document depicting area, and is configured to select the said first and second processes of magnification.

DETAILED DESCRIPTION OF THE PREFERRED EMBODIMENTS

Description will be made hereafter of the preferred embodiments of the present invention with reference to the drawings. It should be noted that although the following embodiments exemplify image forming devices, image forming methods, and programs which embody technical ideas of the present invention, there is no intention to limit the applicability of the present invention to them, and other embodiments that do not deviate from the scope the of the claims are equally adaptable.

First Embodiment

Figure 1:
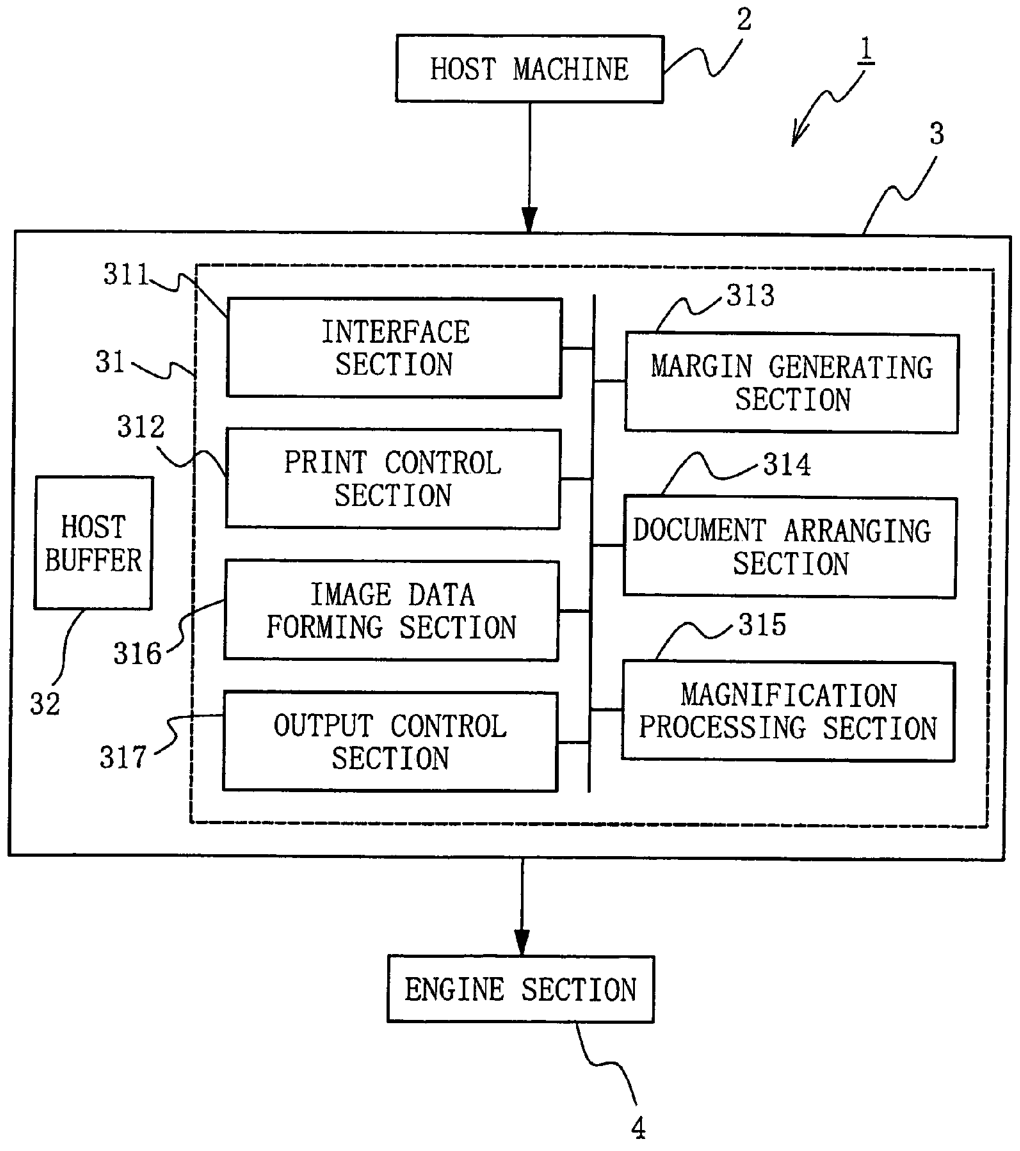
FIG. 1 is a block diagram showing a printing system to which an image forming device according to the first embodiment of the present invention is applied.
Figure 2:
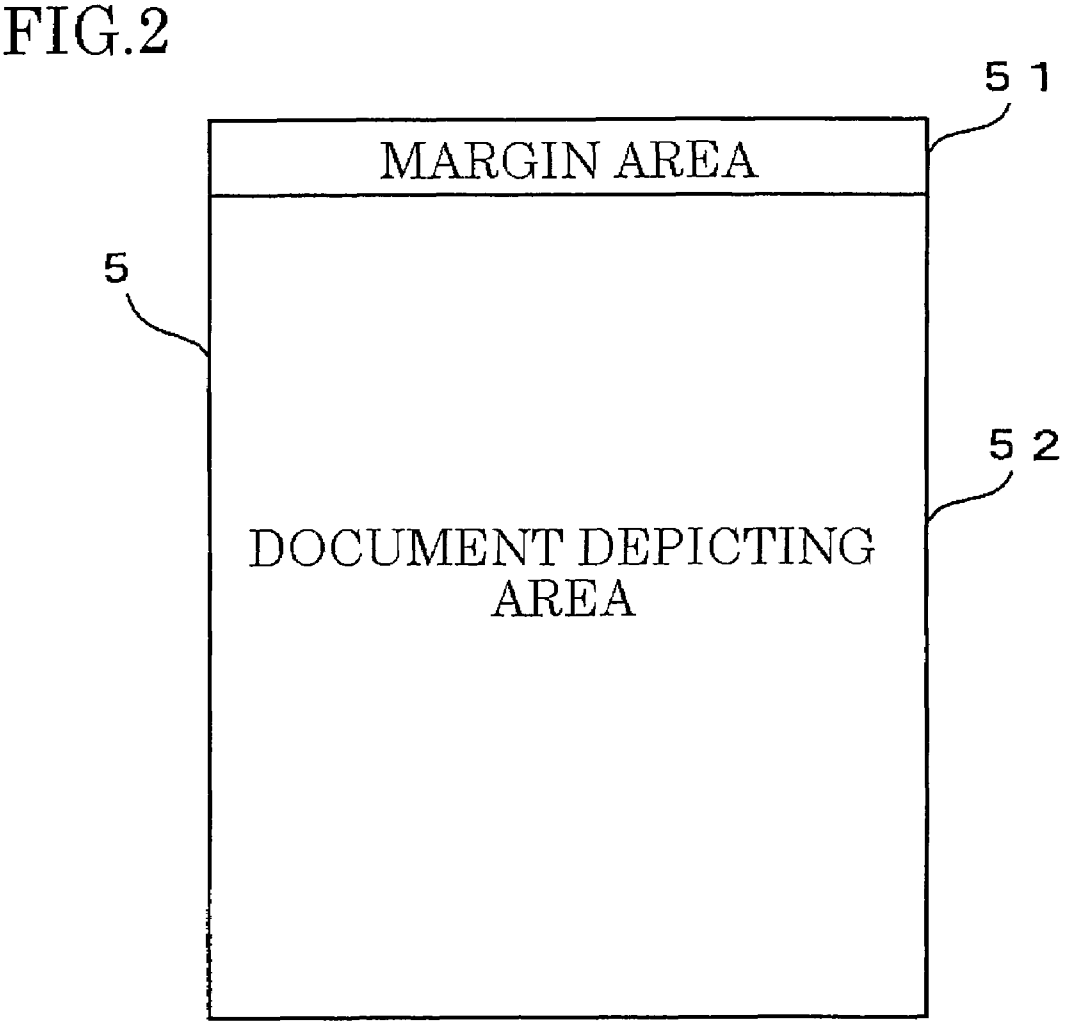
FIG. 2 is a descriptive view showing the setting state of an output sheet according to the first embodiment of the present invention.
Figure 3:
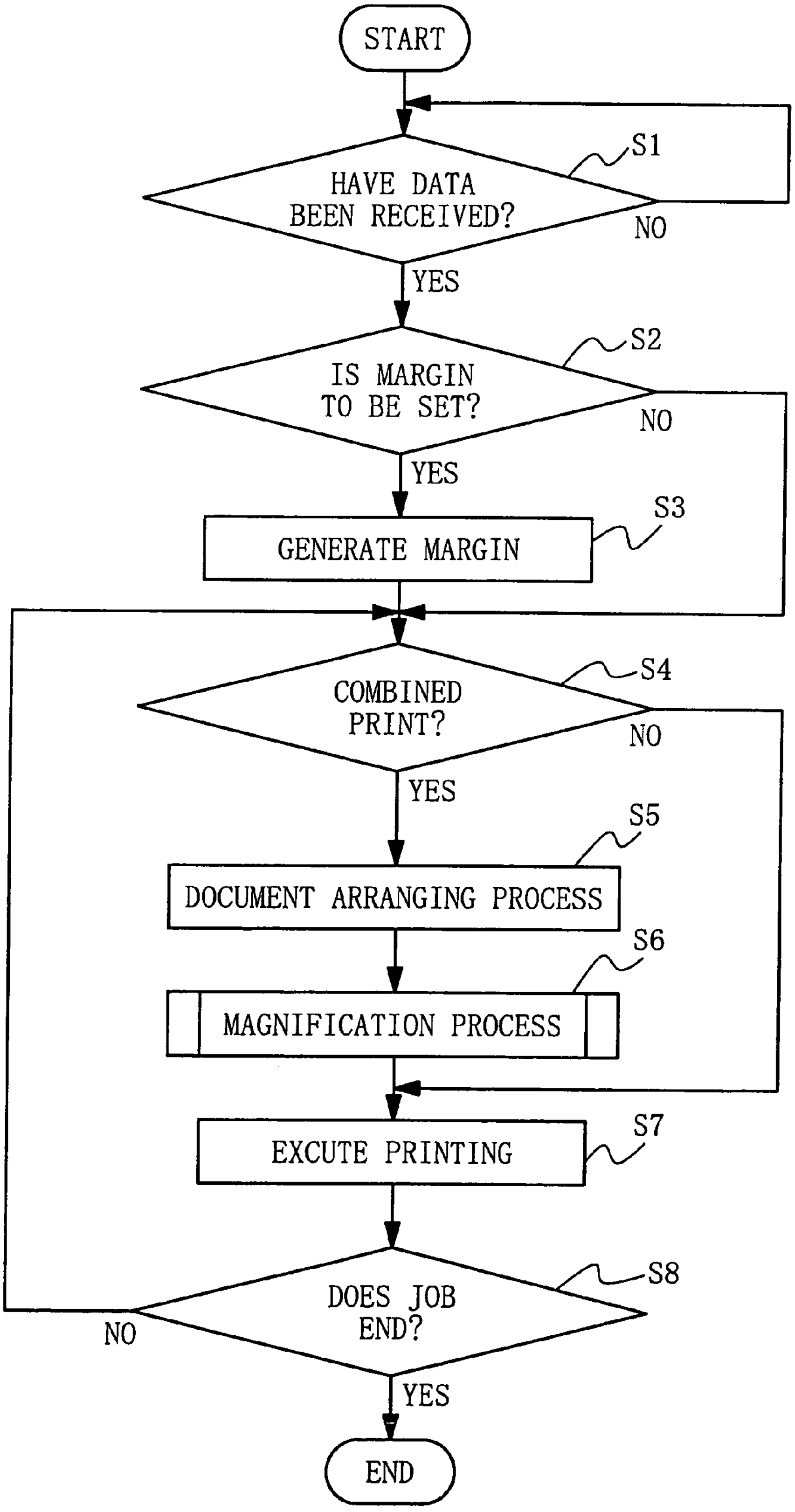
FIG. 3 is a flowchart showing the operation of the printing system referred to in FIG. 1.
Figure 5:
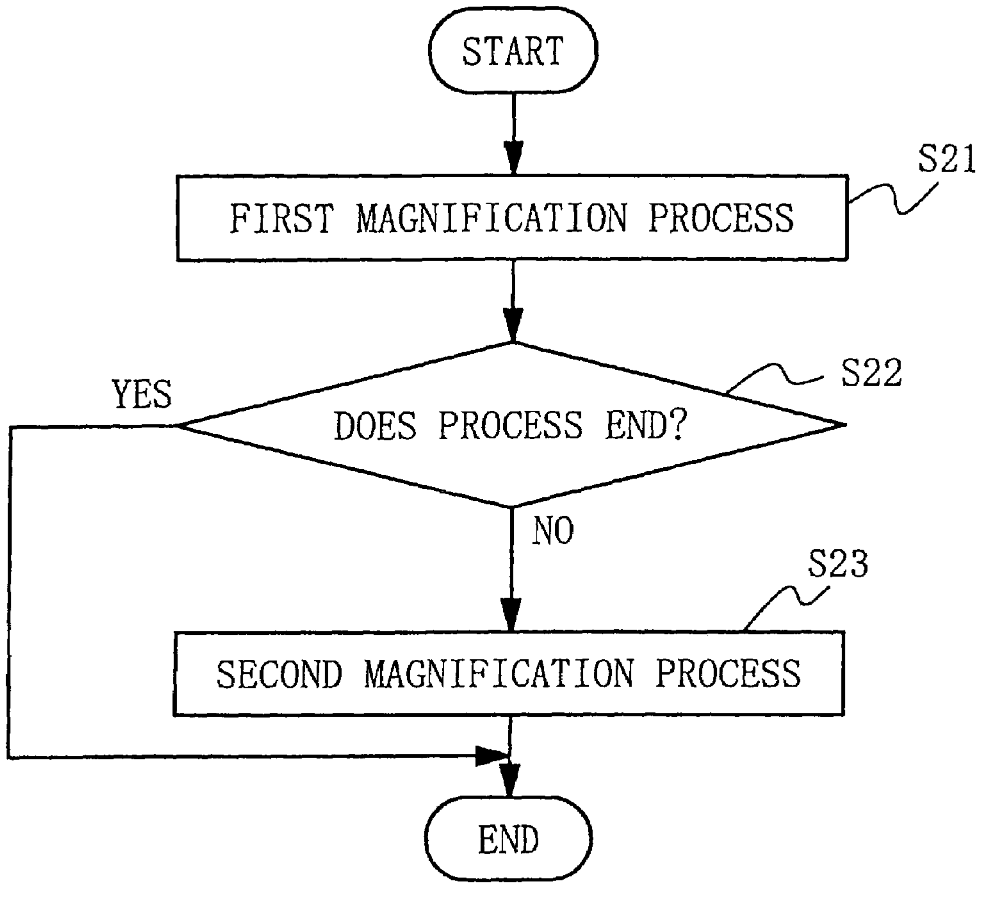
FIG. 5 is a flowchart showing a subroutine of the magnification process referred to in FIG. 3.
Figure 6:
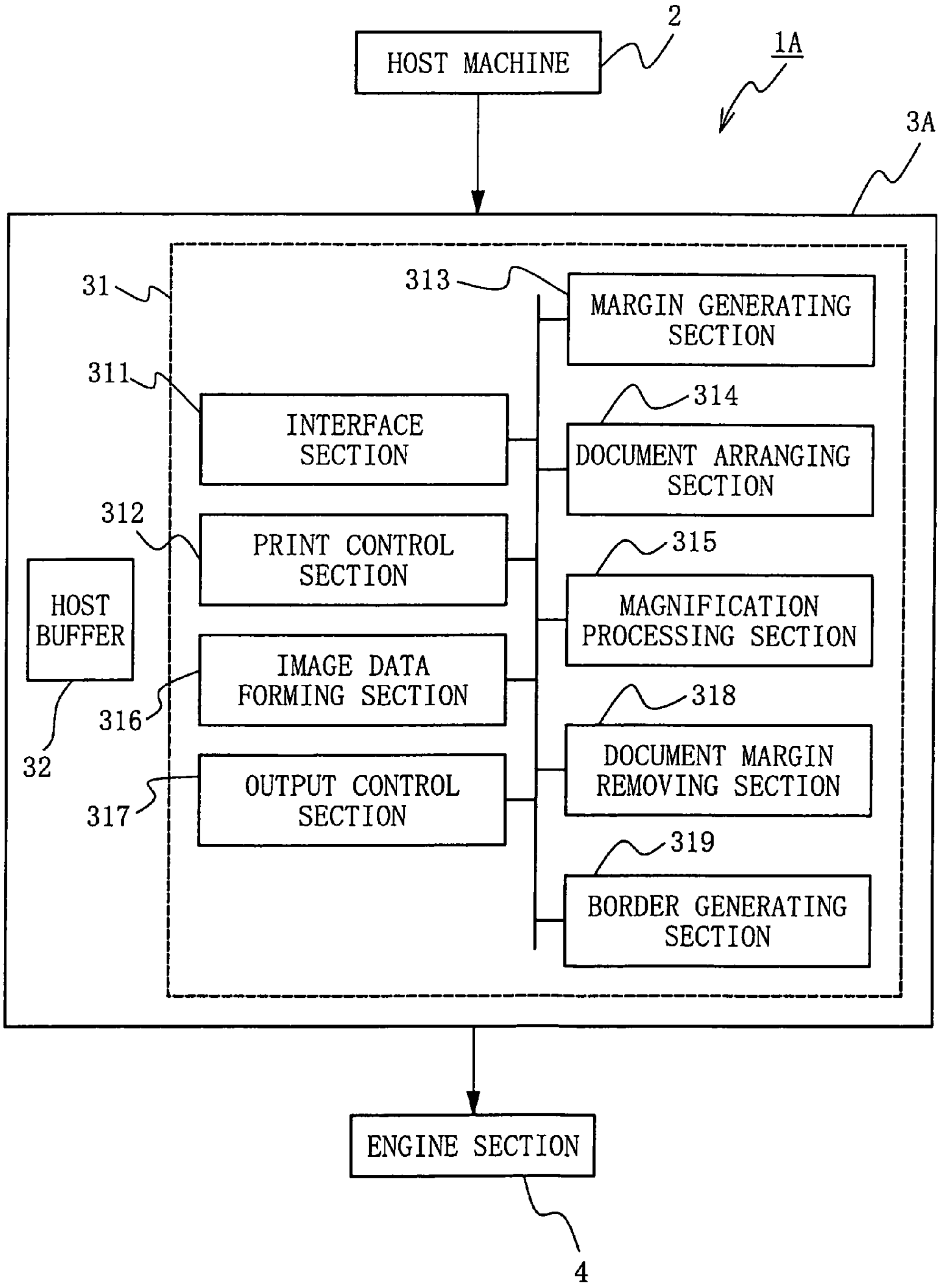
FIG. 6 is a block diagram showing a printing system to which an image forming device according to a second embodiment of the present invention is applied.
Figure 7:
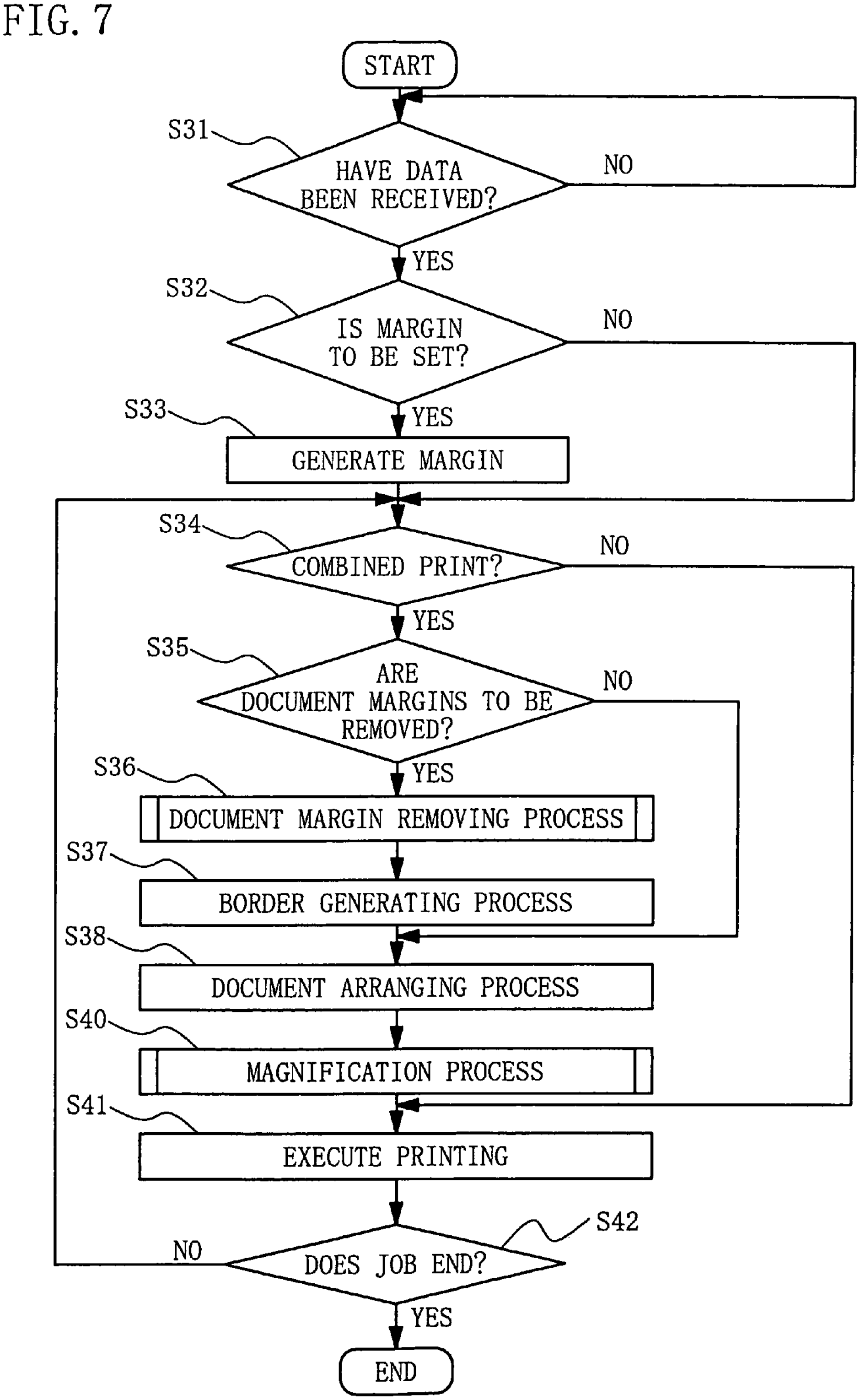
FIG. 7 is a flowchart showing the operation of the printing system in referred to in FIG. 6.
Figure 8:
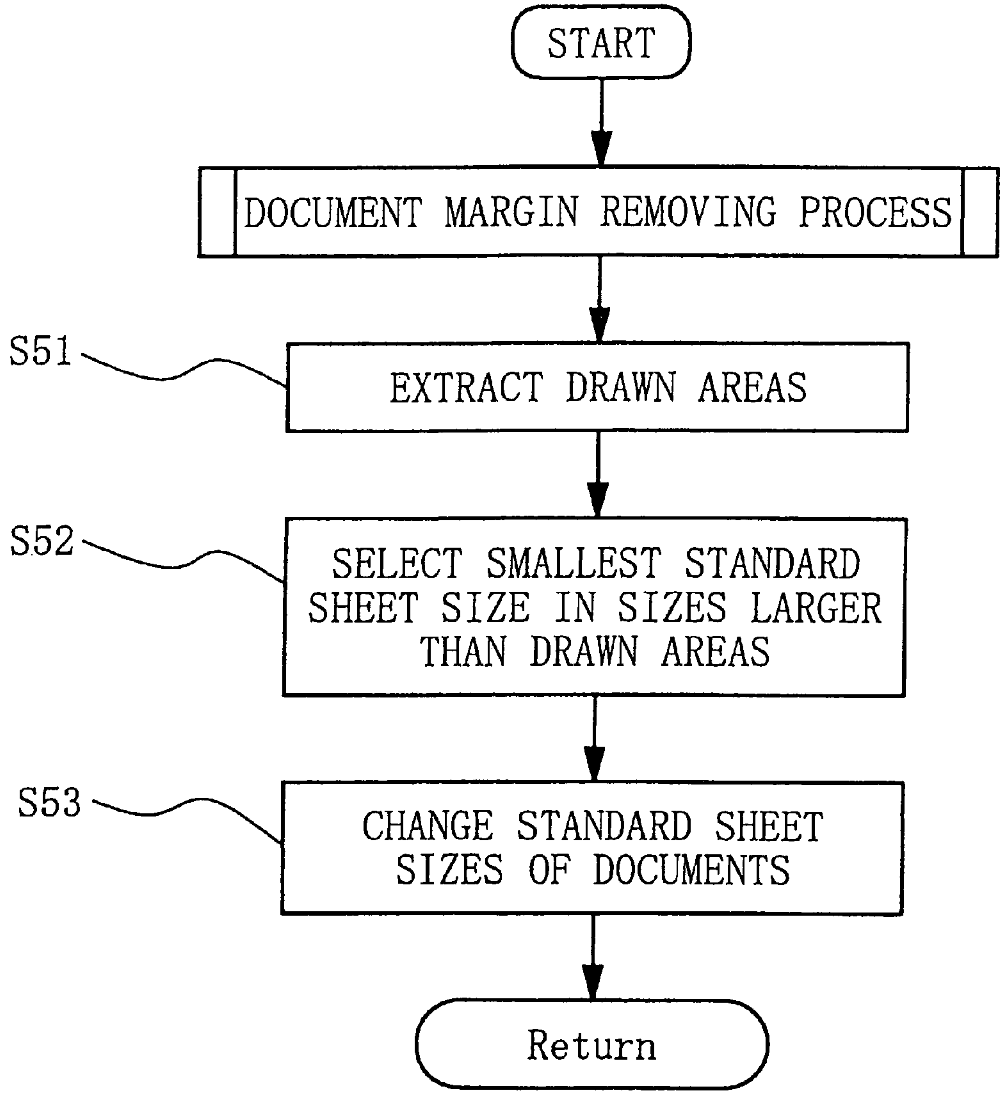
FIG. 8 is a flowchart showing a subroutine of the document margin removing process referred to in FIG. 7.
Figure 9:
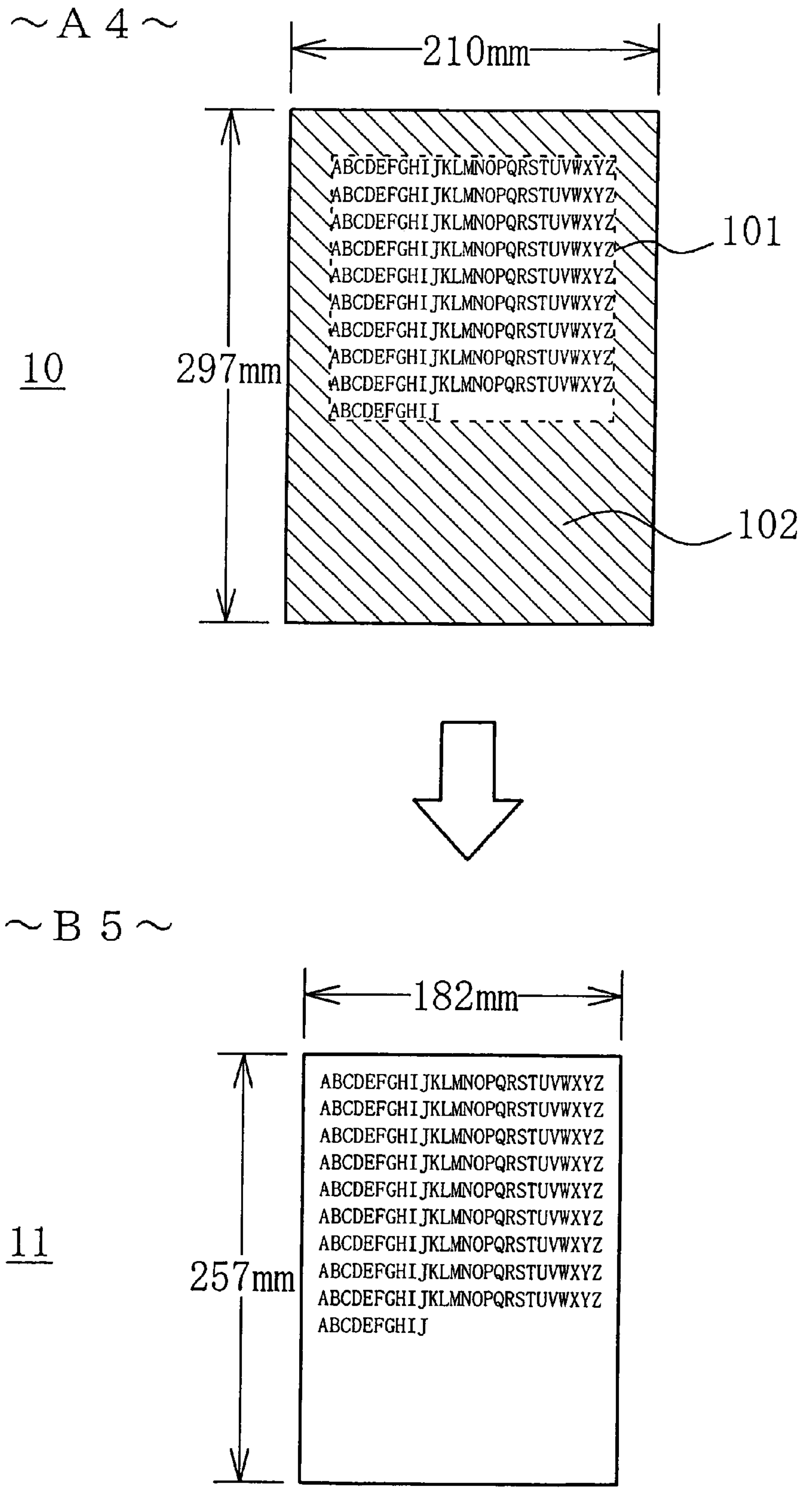
FIG. 9 is a descriptive view showing the state where the standard sheet size of a document has been changed by the document margin removing process.

FIG. 1 is a block diagram showing a printing system to which an image forming device according to the first embodiment of the present invention is applied, FIG. 2 is a descriptive view showing the setting state of an output sheet according to the first embodiment of the present invention, FIG. 3 is a flowchart showing the operation of the printing system referred to in FIG. 1, while FIGS. 4(A) to 4(E) are descriptive views showing the process involved leading to the generation of image data derived from multiple documents for combined printing according to the first embodiment of the present invention, and shows the steps of processing in respective stages. FIG. 5 is a flowchart showing a subroutine of the magnification process referred to in FIG. 3, FIG. 6 is a block diagram showing a printing system to which an image forming device according to a second embodiment of the present invention is applied, FIG. 7 is a flowchart showing the operation of the printing system referred to in FIG. 6, FIG. 8 is a flowchart showing a subroutine of the document margin removing process referred to in FIG. 7, while FIG. 9 is a descriptive view showing the state where the standard sheet size of a document has been adjusted by the document margin removing process.

The print system 1 to which the image forming device according to the first embodiment of the present invention is applied includes a host machine 2, a print image data forming section 3, and an engine section 4 as shown in FIG. 1. Image data generated by the host machine: 2 are transmitted to the print image data forming section 3, converted into predetermined print image data in the print image data forming section 3, and transmitted to the engine section 4 as image data used for printing.

The print image data forming section 3 includes an arithmetic processing circuit 31 and a host buffer 32. The arithmetic processing circuit 31 includes an interface section 311, a print control section 312, a margin generating section 313, a document arranging section 314, a magnification processing section 315, an image data forming section 316, and an output control section 317. The image data transmitted from the host machine 2 are received by the interface section 311, and stored in the host buffer 32. The print control section 312 is configured so as to set print conditions such as the number of copies, paper size, and font size according to an input operation carried out upon an operation panel (not shown).

The margin generating section 313 generates setting data for a margin according to an input operation carried out upon the operation panel. Moreover, the document arranging section 314 and the magnification processing section 315 edit the print conditions for the image data according to the setting data generated by the print control section 312 and the margin generating section 313. The edited image data are formed as the image data for printing in the image data forming section 316, and transmitted from the output control section 317 to the engine section 4. It should be noted that the generation of margin areas by the margin generating section 313 is not always necessary, and is used only when an area is required for staples and the like. Therefore, when a margin area is not generated, the entire output sheet of paper represents the document depicting area.

The margin generating section 313 generates a margin area 51 used for staples, memos, inserted images, and the like used after printing has been carried out upon an output sheet 5 of A4 size with portrait orientation, or example, as shown in FIG. 2. Namely, the margin generating section 313 generates the setting data in respect of the margin area 51. The document arranging section 314 and the magnification processing section 315 set a portion of the output sheet 5 excluding the margin area 51 as document depicting area. 52, and automatically reduce and arrange the multiple documents so as to fit the multiple documents into the document depicting area 52. If the paper to be used is of the standard size, the document arranging section 314 is provided with a program which controls and sets the proper arrangement based upon the area of the document depicting area 52 and the size of the documents. Moreover, since the document sizes, are predetermined standard sheet sizes (such as A4 and B5), arrangements may be set in advance based on combinations of these sizes.

A description will now be given of the operation of the printing system 1 to which the image forming device having the above configuration is applied with reference to the flowchart shown in FIG. 3. First, in step S1, it is determined whether the image data generated by the host machine 2 has been received by the interface section 311. If the image data has been received, the image data is held by the host buffer 32. The user then makes the desired setting for the print sheet by means of input operation upon the operation panel. It is then determined whether the user has carried out the operation to set the margin or margins upon the operation panel as shown in step S2. If the user has set the margin or margins, the margin generating section 313 generates the setting data of the predetermined margin in the next step S3. It is then determined whether the user has specified combined printing of step S4. If it is determined that combined printing has been specified, the system will carry out the process of editing the image data relating to the automatic arrangement of documents by means of the document arranging section 314 in step S5, and then carries out the process of editing the image data relating to the magnification process by means of the magnification processing section 315 in step S6.

Figure 4A:
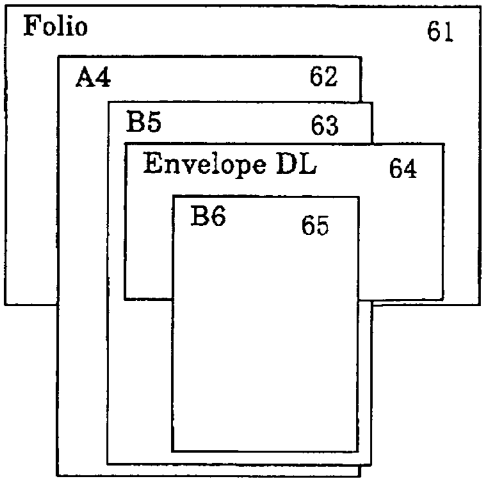
FIGS. 4(A) to 4(E) are descriptive views showing the process involved leading to the generation of image data derived from multiple documents for combined printing according to the first embodiment of the present invention, and shows the steps of processing in respective stages.

Description in detail of the operation involved from the margin generation to the magnification process will hereafter be given, for example, in the case where five documents 61, 62, 63, 64, and 65 of varying sizes as shown in FIG. 4(A) are collectively printed on the output sheet 5 of A4 size as shown in FIG. 2. On this occasion, it is assumed that the sizes of the documents 61, 62, 63, 64, and 65 are respectively Folio, A4, B5, Envelope DL, and B6.

Figure 4B:
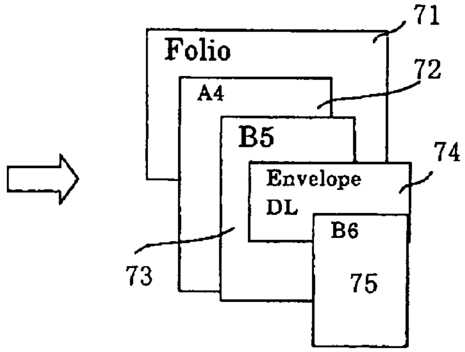
Figure 4C:
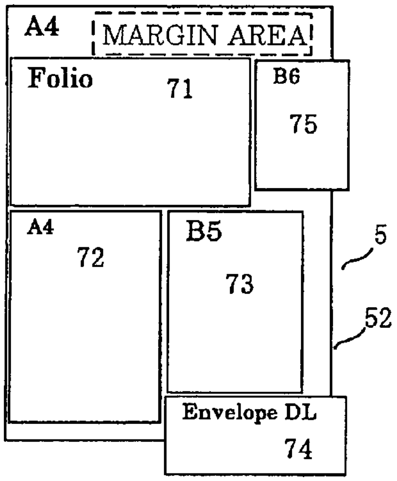

First, in the margin setting of step S3, the margin area 51 is set as a margin upon the output sheet 5, and the remaining area is set as the document depicting area 52 by the margin generating section 313 as shown in FIG. 2. In the automatic document arrangement carried out by the document arranging section 314 in step S5, the total area of the five documents 61 to 65 is first reduced to achieve uniform magnification until the total area fits into the document depicting area 52, resulting in images 71, 72, 73, 74, and 75 as shown in FIG. 4(B). Then, as shown in FIG. 4(C), the reduced images 71 to 75 are sequentially arranged from the one with the largest area, and the image data 71 with the largest area is then arranged with respect to the top left corner of the document depicting area 52 as a reference. Then, the other images 72 to 75 from the one with the largest area are sequentially arranged rightward and downward from the image 71.

During the arrangement of the other images 72 to 75, the document arranging section 314 arranges images with portrait orientation rightward, and images with landscape orientation are arranged downward while considering the size of the margin or margins. If the images 74 and 54 still run off from the edges of the output sheet 5 after the document arranging section 314 has completed the process, the magnification processing section 315 then carries out the magnification process in step S6.

Figure 4D:
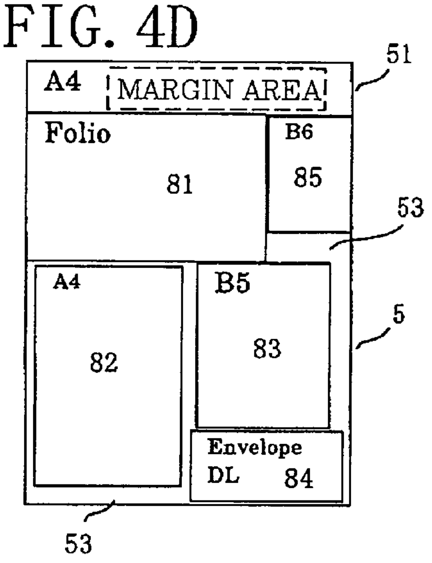
Figure 4E:
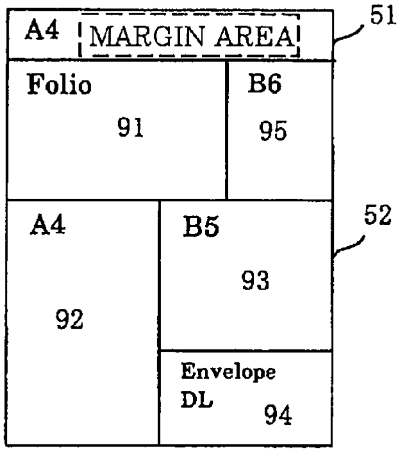

A detailed description will now be given of the magnification process with reference to the flowchart shown in FIG. 5. First, in the initial magnification process of step S21, the images 71 to 74 are reduced to have the same magnification in order to fit and not run off the edges of the output sheet 5, namely the document depicting area 52, as shown in FIG. 4(D), resulting in documents 81, 82, 83, 84, and 85. This reduction magnification carried out is minimal. As a result of this arrangement, a number of blanks 53 are generated in the document depicting area 52. In the next step S22, it is determined whether the user has issued the instruction to end the magnification process. X As a result of this determination, if the instruction to end the magnification process has not been made, the magnification of the respective length and width of the images 81 to 85 would be independently adjusted until the blanks 53 disappear, and images 91, 92, 93, 94, and 95 are obtained as shown in FIG. 4(E) in step S23. The magnification process of step S6 ends upon completion of this second magnification process.

If the user wants to start printing immediately after the completion of the first magnification process, the corresponding operation to carry out this intention is determined in step S22, and the magnification process ends. The completion of the first magnification process results in the end of the magnification process of step S21 in the state shown in FIG. 4(D) where the blanks 53 still remain.

In this manner, the magnification processing section 315 can select between the magnification shown in FIG. 4(D), where although blanks 53 are more or less generated, the magnification of the multiple documents 61 to 65 is entirely adjusted to achieve uniform magnification into the easily viewable state as images 81 to 85 and the magnification change shown in FIG. 4(E) where the magnification of multiple documents 61 to 65 is independently adjusted into images 91 to 95 without blanks, thereby realizing efficient space utilization of the output sheet 5. In other words, the user can arbitrarily select the combined print shown in FIG. 4(D) or the combined print shown in FIG. 4(E).

The data changed as a result of magnification carried out by the magnification processing section 315 is stored as print image data in the image data forming section 316. The image data in the image data forming section 316 is then transmitted to the engine section 4 by the output control section 317 in step S7. The printing job is then determined to have ended, and the combined print ends in the next step S8. If printing is carried out without the combined print, it is then determined whether the user has instructed the combined printing of step S4 or not. According to the determined result, the print system 1 instructs the execution of the printing job in step S7, and ordinary printing is carried out accordingly.

According to the print system 1 of the first embodiment of the present invention, the image data transmitted from the host machine 2 are stored in the host buffer 32, and the margin generating section 313 generates the margin area 51 upon the output sheet 5 before the combined print. In the print system 1, the magnification of the multiple documents 61 to 65 is then adjusted to a size in order to fit into the document depicting area 52 which is an area of the output sheet 5 excluding the margin area 51, and the multiple documents 71 to 75 whose magnification has been adjusted are sequentially arranged with respect to the reference point upon the document depicting area 52 by the document arranging section 314. In the print system 1, the magnification of multiple documents 71 to 75 is then adjusted so as to entirely fit into the document depicting area 52 by means of the first magnification process in step S21 of the magnification processing section 315, and the multiple documents 81 to 85 are thus printed while the margin area 51 used subsequently is allocated and reserved on the output sheet 5, the multiple documents 81 to 85 do not run off the edges of the output sheet 5, and the blanks 53 are minimized.

Accordingly, the combined print results in the state where the multiple documents 61 to 65 are easily viewable with efficient space utilization of the output sheet 5 while the margin area 51 is reserved. Moreover, even if the multiple documents 61 to 65 differ in size, the print system 1 arranges them with efficient space utilization of the singular output sheet 5, and the setting operation therefor is simple.

Moreover, since the magnification processing section 315 can select the execution of the second magnification process of step S23 after completion of the first magnification process of step S21, and independently adjusts the magnification of the respective multiple documents 81 to 85 until the blanks disappear, combined printing with efficient space utilization is achieved. On the other hand, if the magnification processing section 315 selects the execution until the completion of the first magnification process of step S21, the easily viewable combined printing where magnification of all of the multiple documents is adjusted to achieve uniform magnification can be achieved, even if blank spaces are generated, more or less.

Second Embodiment

Description will now be given of a print system 1A to which an image forming device according to the second embodiment of the present invention is applied. FIG. 6 is a block diagram showing a printing system to which an image forming device according to a second embodiment of the present invention is applied, FIG. 7 is a flowchart showing the operation of the printing system in referred to in FIG. 6, FIG. 8 is a flowchart showing a subroutine of the document margin removing process referred to in FIG. 7, while FIG. 9 is a descriptive view showing the state where the standard sheet size of a document has been changed by the document margin removing process.

The print system 1A according to the second embodiment differs from that of the first embodiment only in that there are provided a document margin removing section 318 and a border generating section 319 in the arithmetic operation processing circuit 31 of a print image data forming section 3A, and is similar to that of the first embodiment in terms of all other configurations as shown in FIG. 6. Description will thus be given only of the dissimilar configurations to avoid duplicate description. The parts and elements of the print system 1A which correspond to those of the print system 1 according to the first embodiment are designated by identical reference numerals, and hence description thereof is omitted.

The document margin removing section 318 removes margin areas of multiple documents received from the host machine 2 via the interface section 311, and such method includes first converting the image data transmitted from the host machine 2 into image data as print data, recognizing drawn areas in which characters and images are drawn, and removing document margin areas where images are not drawn, thereby reducing the size of the documents. Notably, if the image data pertaining to documents whose size has been reduced by the document margin removing section 318 are directly arranged on the output sheet, and whose magnification has been adjusted, mutual borders between the multiple documents become hard to recognize, and the output sheet becomes hard to view. The border generating section 319 thus provides borders indicating border portions of the respective documents in outer edge portions of the reduced image data in order to prevent this problem, and border lines or margin areas with a predetermined size are formed as borders.

Description will now be given of the main routine of the image forming device according to the second embodiment of the present invention with reference to FIG. 7.

First, in step S31, it is determined whether the image data generated by the host machine 2 has been received by the interface section 311. If the image data has been received, the image data are held by the host buffer 32. Then, the user sets a print sheet by input operation upon the operation panel. Then, it is determined whether the user has carried out the operation for setting margin or margins upon the operation panel as shown in step S32. If the user has made such margin setting or settings, the margin generating section 313 generates setting data of the margin in the next step S33, and the image forming process proceeds to step S34. On the other hand, if the margin setting operation has not been carried out in step S32, the image forming process proceeds to step S34.

It is then determined whether the user has specified combined printing in step S34. If it is determined that such instruction has been made, the system will then determine whether a document margin removal setting has been carried out in step S35. If it is determined that the document margin removal setting has not been carried out, the image forming process proceeds to step S38, and carries out the document arranging process. On the other hand, if the document margin removal setting has been carried out, the image forming process proceeds to step S36, and the document margin removing section 318 removes the document margins. A method for the document margin removal will be described in detail later.

The border generating section 319 forms border lines in the outer edge portions of the image data, from which the document margins have been removed in step S36 before the onset of the subsequent document arranging process. The multiple image data in which the border lines have been formed then proceed to the document arranging process of step S38 and the like, and the document arranging process and the subsequent magnification process are similarly carried as those in the first embodiment, and description thereof is therefore omitted.

A description will now be given of a specific example of the document margin removing process shown in step S36 of the above image forming process by the image forming device with reference to FIGS. 8 and 9.

If the document margin removing process is carried out in step S36, drawn areas 101 in which characters or pictures are drawn are detected by scanning data 10 of the documents converted into the image data in step S51 as shown in FIG. 8. All areas other than the detected drawn areas 101 are deemed margin areas 102 of the documents, and thus become unnecessary when multiple documents are combined in one output sheet, and are printed as in the present invention. The document margin areas 102 are thus removed in step S52. The removal of the document margin areas 102 for a document 10 drawn upon a sheet of A4 size as shown in FIG. 9, for example, includes recognizing vertical and horizontal dimensions of a drawn area 101 recognized as a rectangle, and selecting a sheet of paper of standard size upon which this drawn area 101 can be drawn, and is smallest of predetermined standard sheet sizes. In the case of the document data 10 shown in FIG. 9, the smallest standard sheet size which can draw the drawn area 101 is B5, such that the standard sheet size set to this document (A4 in FIG. 9) is changed to the standard sheet size selected in the step S52 (B5 in FIG. 9), new document data 11 is generated in step S53, and the document margin removing process returns to processing starting from step S37.

In the document margin removing process, since the document margins are removed by reducing the document data from the preset standard sheet size to a smaller predetermined standard sheet size, some margin areas may still remain in the new document data in a strict sense. However, if the document margins are removed in this way, the new document data would always have the predetermined standard sheet size, and it is thus possible to easily determine the arrangement of the documents in the document arranging process of step S38, and to restrain the characters in the documents from touching due to the subsequent magnification process and the like. It should be noted that the size of a document may be reduced simply by removing areas other than the drawn area, for example, as well as by means of the document margin removing process in the image forming device according to the present embodiment.

It should be noted that although description has been given of the case where collective or combined printing is carried out by reducing documents according to the embodiments of the present invention, the present invention can obviously be applied to a case where documents of smaller sizes are magnified, then combined for printing upon an output sheet of a larger size. It should be noted that the margin generating section 313 need not generate the margin area always, and may be used only when an area for staples and the like is required. Therefore, when a margin area is not generated, the entire output sheet is used as a document depicting area.

Further, although the document arranging section 314 automatically achieves the best fit arranged state by means of, arithmetic operation based on the size of the documents 71 to 75 and the shape and area of the document depicting area 52 according to the embodiments of the present invention, such arrangement may be manually carried out by the user without automatic arrangement.

Still further, although the upper left corner of the document depicting area 52 of the document arranging section 314 is considered as reference point according to the embodiments of the present invention, other locations such as the upper right corner of the document depicting area 52 may be set as reference.

The present invention including the above configurations provides the following excellent effects. Namely, in the image forming device according to the first aspect of the present invention, since the document arranging means arranges the multiple documents in the document depicting area in order to minimize the generation of blank spaces, and the magnification processing means adjusts the magnification of the multiple documents in order to make them fit entirely into the document depicting area, the multiple documents are printed without running off the edge of the output sheet and with minimum blank spaces. As a result, multiple documents of varying sizes can be printed with maximum space utilization of the output sheet, while the setting operation therefor is simple.

According to the second and eighth aspects of the present invention, the image forming device according to the first or fifth aspect provides, by means of the margin generating means, the utility of generating,in advance the margin area for the positioning and application or insertion of staples, memos, or images to and in the output sheet after printing depending on the user's needs or preferences. As a result, while provision for the margin area can be made on the output sheet, the multiple documents are printed without running off the edge thereof and with minimum blank spaces. Thus, the image forming device according to the first aspect of the present invention provides the utility of reserving a margin area while making the printing of multiple documents of varying sizes with maximum space utilization of the output sheet of paper and a simple setting operation therefor.

According to the third and ninth aspects of the present invention, the document arranging means adjusts the size of multiple documents to make them fit entirely into the document depicting area of the output sheet, and sequentially arranges the multiple documents with respect to the reference point of the document depicting area. Thus, the image forming device provides the utility of efficiently arranging multiple documents of different sizes in one output sheet.

According to the fourth and tenth aspects of the present invention, the magnification processing means may select only the first magnification process to adjust the magnification of multiple documents to achieve uniform magnification, and selects the second magnification process after the completion of the first magnification process to independently adjust the magnification of the respective multiple documents until the blank spaces are eliminated. Thus, the image forming device provides the option to choose between achieving the easily viewable combined print in which the magnification of multiple documents has been adjusted to have uniform magnification even if some blank spaces are generated, and achieving the combined print where the output sheet is efficiently utilized by independently adjusting the magnification of the respective multiple documents to remove any blank spaces.

In the image forming device according the fifth aspect of the present invention, since the document margin removing means recognizes the document margin areas of the multiple documents, and removes the document margin areas to reduce the size of multiple documents, the document arranging means arranges the multiple documents in the document depicting area in order to minimize the generation of blank spaces, and the magnification processing means adjusts the magnification of the multiple documents to fit them entirely into the document depicting area, the multiple documents are printed without running off the edge of the output sheet and with minimum blank spaces. Thus, the image forming device provides the utility of printing multiple documents of varying sizes with maximum space utilization of the output sheet and a simple setting operation therefor.

According to the sixth aspect of the present invention, since the document margin removing means realizes the reduction of the documents by adjusting the size of documents from among default sheet sizes to fit the minimum sheet size, into which the entire drawn area of the documents will fit, the reduced documents are made to fit into a standard sheet size, the image forming device of the present invention therefore provides for the utility of arranging multiple documents by means of the document arranging means, and viewing the documents after magnification thereof has been adjusted by the magnification processing means does not become difficult.

According to the seventh aspect of the present invention, since the border creating means allocates borders in the outer edge portions of the multiple documents, the present image forming device achieves the effect of making the border portions between the multiple documents without becoming vague when the document arranging means arranges the documents reduced by the document margin removing means upon the output sheet, resulting in an easily viewable combined print.

Further, since the image forming method according to the eleventh aspect of the present invention provides for the arrangement of multiple documents in the document depicting area of the output sheet with respect to the one corner of the document depicting area as reference in order to minimize the occurrence of blank spaces, as well as processing the size of the multiple documents by adjusting their magnification to make them fit entirely into the document depicting area changes, the multiple documents are printed without running off the edge of the sheet and with minimum blank spaces. Accordingly, the image forming method of the present invention provides the utility of producing a combined printout of multiple documents of varying sizes with maximum space utilization of the output sheet and a simple setting operation therefor.

According to the twelfth and eighteenth aspects of the present invention, since the image forming method further includes the generation of the margin area on the output sheet, the image forming method of the present invention provides the utility of generating in advance the margin area for the positioning and application or insertion of staples, memos, or images to and in the output sheet after printing depending on the user's needs or preferences.

Further, the image forming method of the present invention according to the thirteenth and nineteenth aspects provides for the adjustment of the size of each of the various documents to achieve uniform magnification to fit the overall area occupied by the documents into the document depicting area on the output sheet and then sequentially arranges the documents with respect to the point of origin of the document depicting area of the output sheet, making the efficient arrangement of multiple documents of varying sizes upon one output sheet possible.

Further, the image forming method according to the fourteenth and twentieth aspects of the present invention provides for the processing of the multiple documents by adjusting their magnification by means of the first magnification process whereby the magnification of the image data of multiple documents is adjusted to achieve uniform magnification to make them fit entirely into the document depicting area without running off the edge of the document depicting area, and by means of the second magnification process in which the magnification of the respective multiple documents is adjusted until blank spaces are eliminated from the image created, independently of the first magnification process and is configured to select only the first magnification process initially and to select the second magnification process upon completion of the first magnification process. Accordingly, the image forming method of the present invention provides the option of choosing between achieving the easily viewable combined print in which the magnification of multiple documents has been adjusted to have uniform magnification even if some blank spaces are generated, and achieving the combined print where the output sheet is efficiently utilized by independently adjusting the magnification of the respective multiple documents to remove any blank spaces.

Further, the image forming method according to the fifteenth aspect of the present invention provides for the recognition of the document margin areas of the multiple documents, and removing such margin areas effectively reduces the size of the multiple documents, the arrangement of the multiple documents in the document depicting area of the output sheet with respect to one corner of the document depicting area as reference in order to minimize the generation of blank spaces, and processing the size of the multiple documents by adjusting their magnification to make them fit entirely into the document depicting area, the multiple documents are printed without running off the edge of the output sheet and with minimum blank spaces. Accordingly, the image forming method of the present invention provides the utility of producing a combined printout of multiple documents of varying sizes with maximum space utilization of the output sheet and a simple setting operation therefor.

Further, according to the sixteenth aspect of the present invention since the method of removing the margin areas of the multiple documents realizes their reduction and adjustment of size from among default sheet sizes to the minimum sheet size into which the entire drawn area of the documents will fit, the reduced documents are made to fit into standard sheet size, facilitating the arrangement of documents as to make them easily viewable after adjustment in magnification.

Further, according to the seventeenth aspect of the present invention, the allocation of borders in the outer edge portions of the makes it possible for the boundaries between the multiple documents not to become vague when they are arranged on the output sheet in reduced form, resulting in an easily viewable combined print.

Further, according to the twenty-first aspect of the present invention the provision for a program for causing a computer equipped with an image forming device used to generate the combined printing of image data obtained from multiple documents in one output sheet, comprising the process of arranging the multiple documents in the document depicting area of the output sheet with respect to one corner of the document depicting area as reference in order to minimize the generation of blank spaces, and the process for adjusting the magnification of sizes of the plurality of documents in order to fit all of the documents into the document depicting area, makes it possible for the image forming program of the present invention to produce a combined printout of multiple documents of varying sizes with maximum space utilization of the output sheet and a simple setting operation therefor.

Further, according to the twenty-second and twenty-eighth aspects of the present invention, the program causes the computer equipped with the image forming device to carry out the process of generating setting data for reserving a margin in advance for positioning and applying or inserting a staple, a memo, or an image, or the like, after printing and the process of generating a margin area on the output sheet based on the setting data, thereby generating the margin area in advance for the positioning and application or insertion of staples, memos, or images to and in the output sheet after printing depending on the user's needs or preferences.

Further, according to the twenty-third and twenty-ninth aspects of the present invention, the program causes the computer equipped with the image forming device to carry out the process of arranging the multiple documents by adjusting their size to achieve uniform magnification in order to fit the overall area occupied by the documents into the document depicting area on the output sheet, and thereafter sequentially arrange the documents with respect to the document depicting area as the reference point, thereby providing for the efficient arrangement of multiple documents of varying sizes in one output sheet.

Further, according to the twenty-fourth and thirtieth aspects of the present invention, the program causes the computer equipped with the image forming device to adjust the magnification of multiple documents by means of the first magnification process, in which the magnification of the image data of each of the documents is carried out to achieve uniform magnification in order to fit them into the document depicting area without running off the edges thereof, and the second magnification process, in which the magnification of the respective documents is adjusted to eliminate any blank spaces in the document depicting area, and is configured to select only the said first process of magnification as well as the second process of magnification after completion of the first process of magnification. In this manner, the image forming device using this program can choose between achieving the easily viewable combined print in which the magnification of multiple documents has been adjusted to have uniform magnification even if some blank spaces are generated, and achieving the combined print where the output sheet is efficiently utilized by independently adjusting the magnification of the respective multiple documents to remove any blank spaces.

Further, according to the twenty-fifth aspect of the present invention, the program causes the computer equipped with the image forming device to generate the combined printing of image data obtained from multiple documents in one output sheet, comprising the process of recognizing the document margin areas of each of the documents, and removing their respective margin areas to reduce their size, the a process of arranging the various documents in the document depicting area of the output sheet with respect to one corner thereof as reference to minimize the generation of blank spaces, the process of adjusting the magnification of sizes of the multiple documents in order to fit all of the documents into the document depicting area.

Further, according to the twenty-sixth aspect of the present invention, the program according to the twenty-fifth aspect, provides for the process of reducing the size of each of the documents by removing the margin area so as to adjust the size of each document from among default sheet sizes to the minimum sheet size into which the entire drawn area of the documents will fit.

Further, according to the twenty-seventh aspect of the present invention, the program according to either of the twenty-fifth or twenty-sixth aspects, comprises the process of allocating borders at boundaries between the multiple documents arranged on the output sheet by virtue of the aforementioned process of arranging the documents.

What is claimed is:

1. An image forming device used to generate the combined printing of image data obtained from a plurality of documents in one output sheet, comprising:

document arranging means that arranges the plurality of documents to appear in the document depicting area of the output sheet with respect to one corner of the document depicting area as reference in order to minimize the generation of blank spaces; and magnification processing means that adjusts the magnification of sizes of the various documents in order to fit all of them completely into the document depicting area wherein said magnification processing means is configured to select the initial magnification process for adjusting magnification of the image data of said documents to have uniform magnification to fit them into the document depicting area without generating a protrusion, and thereafter, select a second magnification process that independently adjusts the magnification of the respective documents to eliminate any blank spaces in the document depicting area.

2. The image forming device according to claim 1, comprising: margin generating means that generates a margin area on the output sheet, wherein said margin generating means generates setting data for reserving a margin in advance for positioning and applying or inserting a staple, a memo, an image, or the like, after printing.

3. The image forming device according to claim 1, wherein said document arranging means adjusts the size of each of the various documents to have the same magnification and to fit the overall area occupied by said documents into the document depicting area of the output sheet, and sequentially arranges said documents starting from the largest document with respect to one corner of the document depicting area as the reference point in order to minimize the generation of blank spaces.

4. An image forming device used to generate the combined printing of image data obtained from a plurality of documents in one output sheet, comprising:

document margin removing means that recognizes document margin areas of the plurality of documents, and removes the document margin areas to reduce the size of the documents;

document arranging means that arranges the plurality of documents to appear in the document depicting area of the output sheet with respect to one corner of the document depicting area as reference in order to minimize the generation of blank spaces; and magnification processing means that adjusts the magnification of sizes of the various documents in order to fit them completely into the document depicting area, wherein said magnification processing means is configured to select the initial magnification process for adjusting the magnification of the image data of said documents to have uniform magnification to fit them into the document depicting area without generating a protrusion, and thereafter, select a second magnification process that independently adjusts the magnification of the respective documents to eliminate any blank spaces in the document depicting area.

5. The image forming device according to claim 4, wherein said document margin removing means removes the margin area of a document in order to adjust its size from among default sheet sizes to the minimum sheet size into which the entire drawn area of said document will fit.

6. The image forming device according to either of claims 4 or 5, comprising border creating means that allocates a border at the boundary between the various documents arranged by said document arranging means on the output sheet.

7. The image forming device according to claim 4, comprising margin generating means that generates a margin area on the output sheet, wherein said margin generating means generates setting data for reserving a margin in advance for positioning and applying or inserting a staple, a memo, or an image, or the like, after printing.

8. The image forming device according to claim 4, wherein said document arranging means adjusts the size of each of the various documents to have uniform magnification and to fit the overall area occupied by said documents into the document depicting area of the output sheet, and sequentially arranges said documents starting from the largest document with respect to one corner of the document depicting area as the reference point in order to minimize the generation of blank spaces.

9. An image forming method used to generate the combined printing of image data obtained from a plurality of documents in one output sheet, comprising the following steps:

first, arranging the various documents to appear in the document depicting area of the output sheet with respect to one corner of the document depicting area as reference in order to minimize the generation of blank spaces; and second, adjusting the magnification of sizes of the various documents in order to fit all of them completely into the document depicting area, wherein said step of processing the plurality of documents by adjusting their magnification comprises the following steps: first, adjusting the magnification of the image data of the various documents to achieve uniform magnification in order to fit them into the document depicting area without generating a protrusion, and second, independently adjusting the magnification of each of the documents to eliminate any blank spaces in the document depicting area and is configured to select said first and second steps of magnification processing.

10. The image forming method according to claim 9, comprising the step of generating a margin area on the output sheet, wherein said margin area generating step includes the generation of setting data for reserving a margin in advance for positioning and applying or inserting a staple, a memo, or an image, or the like, after printing.

11. The image forming method according to claim 9, wherein said step of arranging the plurality of documents involves the adjustment of the size of each of the various documents to have the same magnification and to fit the overall area occupied by the documents into the document depicting area on the output sheet and then sequentially arranges the documents starting from the largest document with respect to one corner of the document depicting area of the output sheet as reference point in order to minimize the generation of blank spaces.

12. An image forming method used to generate the combined printing of image data obtained from a plurality of documents in one output sheet, comprising the following steps:

first, recognizing document margin areas of the various documents, and removing their respective margin areas to reduce their size;

second, arranging the various documents in the document depicting area of the output sheet with respect to one corner thereof as reference to minimize the generation of blank spaces; and third, processing the documents by adjusting their magnification to fit all of them completely into the document depicting area, wherein processing the plurality of documents involves adjusting their magnification, consisting of two steps: first, adjusting the magnification of the image data of the documents to achieve uniform magnification in order to fit all of the documents into the document depicting area without generating a protrusion, and second, independently adjusting the magnification of each of the documents to eliminate any blank spaces in the image, and is configured to select said first and second steps of magnification processing.

13. The image forming method according to claim 12, wherein said step of reducing the size of the documents involves the removal of their respective margin areas in order to adjust its size from among default sheet sizes to the minimum sheet size into which the entire drawn area of the documents will fit.

14. The image forming method according to either of claims 12 or 13, comprising the step of allocating a border at the boundary between the various documents arranged on the output sheet by virtue of said step of arranging the documents.

15. The image forming method according to claim 12, comprising the step of generating a margin area on the output sheet, wherein said margin area generating step generates setting data for reserving a margin in advance for positioning and applying or inserting a staple, a memo, or an image or the like, after printing.

16. The image forming method according to claim 12, wherein said step of arranging the plurality of documents involves adjusting their size to achieve uniform magnification to fit the overall area occupied by the plurality of documents into the document depicting area on the output sheet, and thereafter sequentially arranging the documents starting from the largest document with respect to one corner of the document depicting area as the reference point in order to minimize the generation of blank spaces.

17. A computer readable medium encoded with a program for causing a computer equipped with an image forming device used to generate the combined printing of image data obtained from a plurality of documents in one output sheet, comprising:

a process for arranging the plurality of documents in the document depicting area of the output sheet with respect to one corner of the document depicting area as reference in order to minimize the generation of blank spaces; and a process for adjusting the magnification of sizes of the plurality of documents in order to fit all of the documents into the document depicting area, wherein adjusting the magnification of the plurality of documents comprises two processes: first, changing the magnification of the image data of each of the documents to achieve uniform magnification in order to fit them into the document depicting area without generating a protrusion, and second, independently adjusting the magnification of the respective documents to eliminate any blank spaces in the document depicting area, and is configured to select said first and second processes of magnification.

18. The computer readable medium encoded with a program according to claim 17, comprising:

a process for generating setting data for reserving a margin in advance for positioning and applying or inserting a staple, a memo, or an image, or the like, after printing; and a process for generating a margin area on the output sheet based on the setting data.

19. The computer readable medium encoded with a program according to claim 17, wherein said process for arranging the plurality of documents involves adjusting their size to achieve uniform magnification in order to fit the overall area occupied by the documents into the document depicting area on the output sheet, and thereafter sequentially arranging the documents starting from the largest document with respect to one corner of the document depicting area as the reference point in order to minimize the generation of blank spaces.

20. A computer readable medium encoded with a program for causing a computer equipped with an image forming device used to generate the combined printing of image data obtained from a plurality of documents in one output sheet, comprising:

a process for recognizing the document margin areas of each of the documents, and removing their respective margin areas to reduce their size;

a process for arranging the various documents in the document depicting area of the output sheet with respect to one corner thereof as reference to minimize the generation of blank spaces;

a process for adjusting the magnification of sizes of the plurality of documents in order to fit all of the documents into the document depicting area, wherein adjusting the magnification of the plurality of documents comprises two processes: first, magnifying the image data of each of the documents to achieve uniform magnification in order to fit the plurality of documents into the document depicting area without generating a protrusion, and second, independently adjusting the magnification of the respective documents to eliminate any blank spaces in the document depicting area, and is configured to select said first and second processes of magnification.

21. The computer readable medium encoded with a program according to claim 20, wherein said process for reducing the size of each of the documents involves removing the margin area so as to adjust the size of each document from among default sheet sizes to the minimum sheet size into which the entire drawn area of the documents will fit.

22. The computer readable medium encoded with a program according to either of claims 20 or 21, comprising a process of allocating a border at the boundary between the various documents arranged on the output sheet by virtue of said process of arranging the documents.

23. The computer readable medium encoded with a program according to claim 20, comprising:

a process for generating setting data for reserving a margin in advance for positioning and applying or inserting a staple, a memo, or an image or the like, after printing; and a process for generating a margin area on the output sheet based on the setting data.

24. The computer readable medium encoded with a program according to claim 20, wherein said process for arranging the plurality of documents involves adjusting the size of each of the documents to achieve uniform magnification in order to fit the overall area occupied by the documents into the document depicting area on the output sheet, and thereafter sequentially arranging the documents starting from the largest document with respect to one corner of the document depicting area as the reference point in order to minimize the generation of blank spaces.

* * * * *